(12) United States Patent
Adler

(10) Patent No.: US 7,568,607 B2
(45) Date of Patent: Aug. 4, 2009

(54) APPARATUS AND METHOD FOR WELDING A POUR SPOUT FITMENT TO A CONTAINER

(75) Inventor: Nils Peter Adler, Asker (NO)

(73) Assignee: Elopak Systems AG (CH)

( * ) Notice: Subject to any disclaimer, the term of this patent is extended or adjusted under 35 U.S.C. 154(b) by 256 days.

(21) Appl. No.: 10/540,894

(22) PCT Filed: Dec. 24, 2003

(86) PCT No.: PCT/IB03/06201

§ 371 (c)(1),
(2), (4) Date: Mar. 29, 2006

(87) PCT Pub. No.: WO2004/058574

PCT Pub. Date: Jul. 15, 2004

(65) Prior Publication Data

US 2006/0175376 A1    Aug. 10, 2006

(30) Foreign Application Priority Data

Dec. 28, 2002    (GB) .................................. 0230237.0

(51) Int. Cl.
*B23K 20/10*    (2006.01)

(52) U.S. Cl. ................. 228/110.1; 228/111; 228/111.5; 228/1.1; 156/73.1; 156/73.5; 156/73.6; 156/580.1; 156/580.2; 493/87

(58) Field of Classification Search .................. 53/410; 493/87; 156/73.1, 73.5, 73.6, 580.1, 580.2; 228/110.1, 111, 111.5, 1.1

See application file for complete search history.

(56) References Cited

U.S. PATENT DOCUMENTS 5,653,832 A * 8/1997 Thompson et al. ......... 156/73.1
5,759,319 A * 6/1998 Moody et al. ............... 156/73.1
6,085,489 A * 7/2000 Bachner et al. ................ 53/410

* cited by examiner

*Primary Examiner*—Kiley Stoner
*Assistant Examiner*—Erin B Saad
(74) *Attorney, Agent, or Firm*—Warn Partners, P.C.

(57) ABSTRACT

Apparatus for use in welding a pour spout fitment (22) to a container (32) comprises an ultrasonic welding horn (18) formed with a recess (20) at one end for receiving part of the fitment (22), an anvil (2) between an annular surface portion of which and that one end of the horn (18) are vibratingly pressed a wall off the container (32) and the flange (28) to each other, a head (14) at the opposite end of the head (14) for maintaining an annular, radially inner portion of the flange (28) spaced axially outwards from the annular surface portion of the anvil (2), the outer periphery of the ring (16) being radially dimensioned to be received in the recess (20).

3 Claims, 1 Drawing Sheet

APPARATUS AND METHOD FOR WELDING A POUR SPOUT FITMENT TO A CONTAINER

Figure 1:
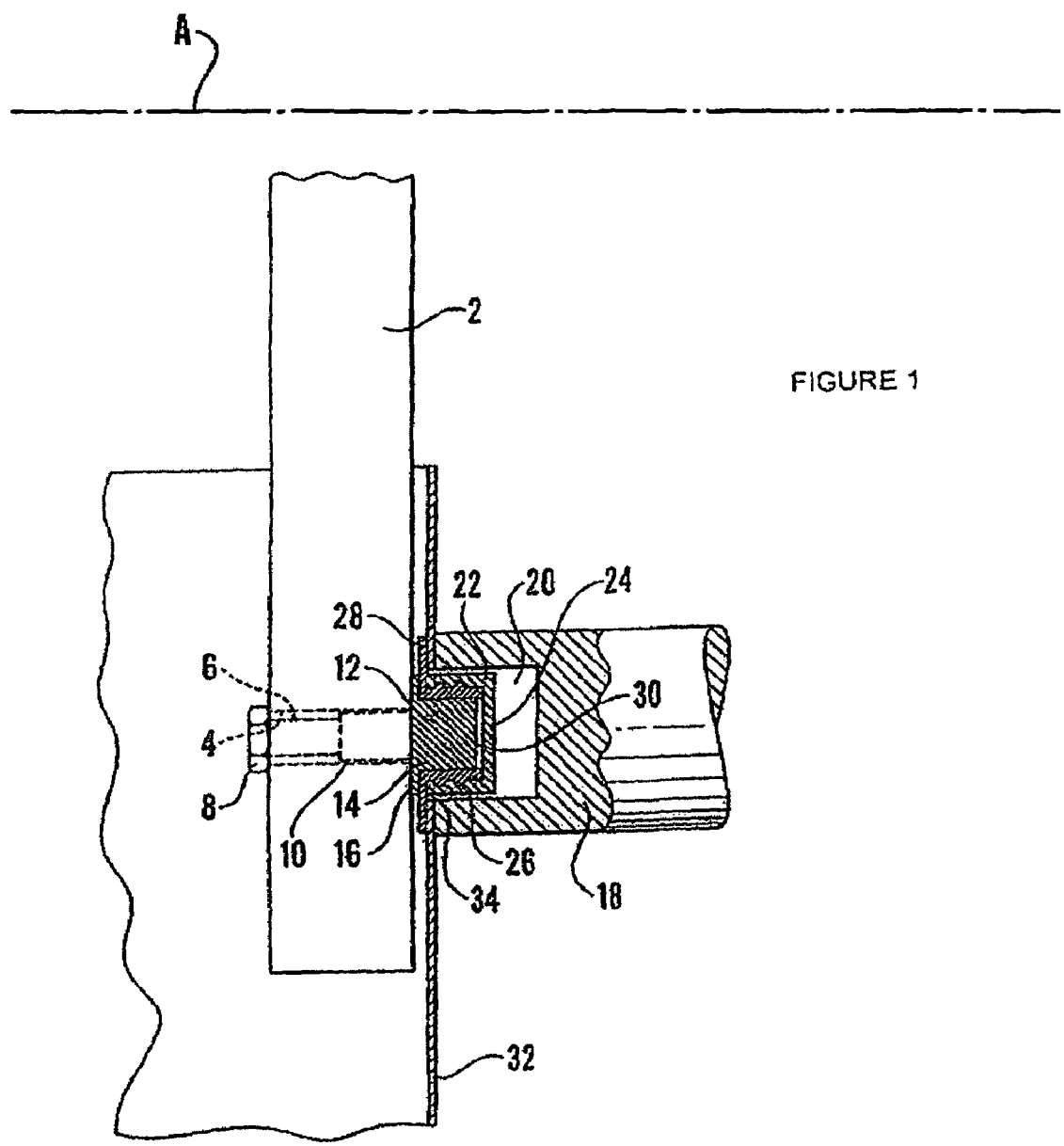

This invention relates to apparatus for use in welding a screw-threaded pour spout fitment to a container, to a method of welding such fitment to such container, and to a spigot which can be included in the apparatus.

Applicators are known for ultrasonically welding plastics, screw-threaded pour spout fitments to plastics-coated paperboard cartons from the insides of open tops of the cartons. The applicator may include a member rotating about a horizontal axis and comprised of a plurality of arms extending from a hub, each arm carrying near its outer end a horizontally protruding head for receiving the fitment. The fitment usually consists of a screw cap screwed onto a flanged, externally-threaded, pour spout. As the member rotates, a fitment on the head is transported by the arm to a position co-axial with an ultrasonic welding horn formed co-axially at its free end with a recess. Then the member is advanced along its axis of rotation to introduce the fitment into a hole through the wall of a carton until the flange arrives at the inside surface of the wall. With the fitment in that position, the ultrasonic horn is advanced to receive, with clearance, the cap, the threaded part of the pour spout, and the head and vibratingly presses together, between its free end and an annular surface portion of the arm, the flange and the carton wall so as to weld the flange to the inside of the wall. We have found that applicators of this type suffer from the problem that, depending upon manufacturing tolerances in the fitment, application of high energy by the horn, in order to obtain a good weld between the flange and the wall, can result in such vibration of the fitment as to cause the screw threads of the cap and the spout to weld together to a degree that the cap is very hard, or even impossible, for a human being to unscrew from the spout without using a tool.

U.S. Pat. No. 5,653,832 discloses an applicator of this type which includes a downwardly-forwardly slanted arm portion carrying a spud and a weld back-up support which surrounds the inner end of the spud and serves to engage the axially outer face of a flange of the fitment. The spud and the support are integral with each other and detachable as a unit from the arm portion for special cleaning. The annular support is illustrated as being of external diameter equal to that of the flange of the fitment. The applicator also includes an ultrasonic horn formed with a recess in its free end, which recess receives with clearance the spud and a screw-threaded part of the fitment. The spud is shown as terminating short of the substantially planar inside surface of the screw cap of the fitment.

A somewhat similar applicator is disclosed in U.S. Pat. No. 5,484,374, except that the spud is provided by a spigot which is fixed in a shallow bore in the arm portion, that an annular surface portion of the arm portion itself provides the weld back-up support, and that, with the fitment fully loaded onto the spud, the spud extends to the planar inside surface of the screw cap of the fitment.

An applicator very similar to that of U.S. Pat. No. 5,484,374 is disclosed in U.S. Pat. No. 6,085,489, except that, disposed-on the front face of each lobe of the rotary spider is a circular anvil and a mandrel extending perpendicularly from the front face of the anvil. The mandrel can be either machined on the surface of the anvil or secured to that surface by means of a machine bolt. Likewise, each anvil or anvil/mandrel combination can either be machined as an integral part of an anvil housing of the lobe or, preferably, be secured to the anvil housing by means of a machine bolt.

We consider that the applicators of all of U.S. Pat. No. 5,653,832; U.S. Pat. No. 5,484,374 and U.S. Pat. No. 6,085,489 may both, upon occasions, produce the problem mentioned above.

According to one aspect of the present invention, there is provided apparatus for use in welding a pour spout fitment to a container, comprising an ultrasonic welding horn formed with a recess at one end thereof for receiving part of said fitment, an anvil between an annular surface portion of which and said one end of the horn are vibratingly pressed a wall of said container and a flange of said fitment to weld said wall and said flange to each other, a head fixed relative to and protruding from said anvil for receiving said fitment over a free end thereof, and a ring substantially co-axial with said head and protruding substantially radially outwards from said head at an end thereof opposite to said free end for maintaining an annular, radially inner portion of said flange spaced axially outwards from said annular surface portion, characterized in that the outer periphery of said ring is of a diametral dimension less than a diametral dimension of said recess.

According to another aspect of the present invention, there is provided a method of welding a pour spout fitment to a container, comprising causing the fitment to be received over a free end of a head fixed relative to and protruding from an anvil, and introducing said head and thereby part of said fitment into a recess in an end of an ultrasonic welding horn, characterized by vibratingly pressing together, between said end of said horn and an annular surface portion of said anvil, a wall of said container and an annular, radially outer portion of a flange of said fitment to weld said wall and said radially outer portion together, while maintaining an annular, radially inner portion of said flange axially outwardly spaced from said annular surface portion.

Owing to the invention, it is possible to avoid excessive welding together of co-operating pieces of the fitment, which welding has the result of significantly increasing the torque required to open the fitment, which can in the worst circumstances make it impossible for a human being to open the fitment without using a tool.

The invention is particularly applicable in the case where the co-operating pieces of the fitment are screw threads.

The ring (and, if desired, the head) may be integral with the anvil, but are preferably in the form of a spigot detachable from the anvil to facilitate manufacture of the head and the ring, to facilitate cleaning, and to enable replacement of the head and the ring by another head and ring, particularly for adapting the apparatus more readily for differently dimensioned fitments.

According to a third aspect of the present invention, there is provided a spigot for mounting a pour spout fitment for welding to a container, said spigot comprising a head portion for receiving said fitment over one end thereof and a ring portion substantially co-axial with said head portion and projecting substantially radially outwards from an end of said head portion opposite to said one end.

In order that the invention may be clearly and completely disclosed, reference will now be made, by way of example, to the accompanying drawing in which FIG. 1 illustrates in side elevation partly in vertical section a stage in the welding of a screw-threaded pour spout fitment to a carton.

Referring to the drawing, a rotary arm 2 of an applicator is formed with a horizontal, through bore 4 into which is inserted an externally threaded bolt 6 having a head 8. The bolt 6 is screwed into an internally threaded tubular portion 10 of a spigot 12 to clamp the spigot firmly to the arm 2. The spigot 12 also includes a circular-cylindrical head portion 14 and a flange-form ring portion 16 co-axial with the head portion 14 and the tubular portion 10 and projecting radially outwards from that end of the head portion 14 nearer the arm 2. The arm 2 is not only rotatable about a horizontal axis A but also reciprocable along that axis. In the condition shown in the drawing, the arm 2 has reached a position in which the spigot 12 is co-axial with ant ultrasonic welding horn 18 which is horizontally reciprocable. The free end of the horn 18 is formed co-axially with a circular-cylindrical recess 20 which is of an internal diameter slightly greater than the external diameter of the ring portion 16. At a position above the level of the axis A, the head portion 14 is inserted into a plastics, screw-threaded, pour spout fitment 22 consisting of an internally threaded cap 24 and a flanged, externally-threaded, pour spout 26, with a tamper-evident feature (not shown) in the region where the rim of the mouth of the cap 24 is adjacent to the flange 28 of the pour spout 26. An annular, radially inner portion of the flange 28 bears against, and is co-extensive with, the ring portion 16, whilst the remaining, annular, radially outer portion of the flange 28 protrudes radially beyond the ring portion 16 at a spacing from the arm 2. With the head portion 14 fully inserted into the fitment 22, there is also a spacing 30 between the free end surface of the spigot 12 and the facing, substantially planar internal surface of the cap 24. Once the fitment 22 has been fully loaded onto the head portion 14, the arm 2 is displaced to the left along the axis A and is then rotated to a substantially vertical position in which the spigot 12 is substantially in a vertical plane containing the axis A. This brings the lower end of the arm 2 and, with it, the spigot 12 and the fitment 22 into the interior of a carton 32 comprised of paperboard coated on both faces with thermoplastics, possibly with the interposition of a gas barrier layer. Then the arm 2 is displaced to the right along the axis A to bring the arm 2, the spigot 12 and the fitment 22 into the condition shown in the drawing, in which the head portion 14 and the screw-threaded part of the fitment 22 have been introduced through a hole. 34 through the wall of the carton 32 until the flange 28 comes to bear against the inside surface of the wall, as seen in the drawing.

Then the ultrasonic horn 18 is moved to the left until it vibratingly presses the carton wall and the annular, radially outer portion of the flange 28 against an annular surface portion of the arm 2, the head portion 14, the ring portion 16 and the screw-threaded part of the fitment 22 being received with clearance in the recess 20. Prior to that, with the fitment 22 fully received over the head portion 14 and the horn 18 not yet applied to the carton wall, there is a spacing of from 0.2 mm. to 0.5 mm. between that annular surface portion of the arm 2 and the annular, radially outer portion of the flange 28. The drawing shows the horn 18 in an intermediate position of this movement, in which it has just come to bear against the outside surface of the carton wall. The vibrational pressing together, between the arm 2 and the horn 18, of the carton wall and the annular, radially outer portion of the flange 28 welds the flange 28 securely to the thermoplastics coating at the inside surface of the wall of the carton 32. Then the arm 2 moves away to the left along the axis A and the horn 18 moves away to the right along the axis A and thereafter the arm 2 is turned out of the open top of the carton 32, whereafter the carton is advanced from the fitment-application station (partially represented in the drawing) to filling and sealing on the form-fill-seal packaging machine.

We have found that the provision of the ring portion 16 supporting only a radially inner annular portion of the flange 28 greatly reduces the risk of firm welding of the internal threading of the cap 24 to the external threading of the pour spout 26 induced by the vibrations emanating from the horn 18. It appears that the unwanted firm welding has been caused by the threads impacting against each other during the ultrasonic welding. We have furthermore found that provision of the spacing 30 further reduces that risk. Nevertheless, it is still possible, if so desired, to control opening torque by adjusting the energy input, whilst still obtaining good welding of the flange 28 to the wall of the carton 32. The possible range of torque can be controlled to be from very easy to open to medium hard to open.

It will be understood that the axis of rotation A need not be horizontal but can be in any other orientation desired.

The invention claimed is:

1. Apparatus for use in welding a pour spout fitment to a container, comprising:
   an ultrasonic welding horn formed with a recess at one end thereof for receiving part of said fitment;
   an anvil having an annular surface portion;
   a wall of said container and a flange of said fitment being vibratingly pressed between said annular surface portion and said one end of said horn, thereby welding said wall and said flange to each other;
   a head fixed relative to and protruding from said anvil for receiving said fitment over a free end thereof; and
   a ring substantially co-axial with said head and protruding substantially radially outwards from said head at an end thereof opposite to said free end for maintaining an annular, radially inner portion of said flange spaced axially outwards from said annular surface portion;
   wherein the improvement comprises the outer periphery of said ring being of a diametrical dimension less than a diametrical dimension of said recess.

2. A method of welding a pour spout fitment to a container, comprising causing the fitment to be received over a free end of a head fixed relative to and protruding from an anvil, and introducing said head and thereby part of said fitment into a recess in an end of an ultrasonic welding horn, wherein the improvement comprises vibratingly pressing together, between said end of said horn and an annular surface portion of said anvil, a wall of said container and an annular, radially outer portion of a flange of said fitment to weld said wall and said radially outer portion together, while maintaining an annular, radially inner portion of said flange axially outwardly spaced from said annular surface portion;
   wherein, with said fitment fully received over said head, there is a spacing between a free end surface of said head and a facing surface of said fitment;
   wherein, with said fitment fully received over said head and said horn not yet applied to said wall of said container, there is a spacing of from 0.2 mm. to 0.5 mm. between said annular surface portion of said anvil and said annular, radially outer portion of said flange.

3. A method of welding a pour spout fitment to a container, comprising causing the fitment to be received over a free end of a head fixed relative to and protruding from an anvil, and introducing said head and thereby part of said fitment into a recess in an end of an ultrasonic welding horn, wherein the improvement comprises vibratingly pressing together, between said end of said horn and an annular surface portion of said anvil, a wall of said container and an annular, radially outer portion of a flange of said fitment to weld said wall and said radially outer portion together, while maintaining an annular, radially inner portion of said flange axially outwardly spaced from said annular surface portion;
   wherein, with said fitment fully received over said head and said horn not yet applied to said wall of said container, there is a spacing of from 0.2 mm. to 0.5 mm. between said annular surface portion of said anvil and said annular, radially outward portion of said flange.

* * * * *